May 23, 1967     D. C. ANDREASSON     3,320,833
DEEP-HOLE DRILL AND REAMER
Filed Nov. 23, 1964
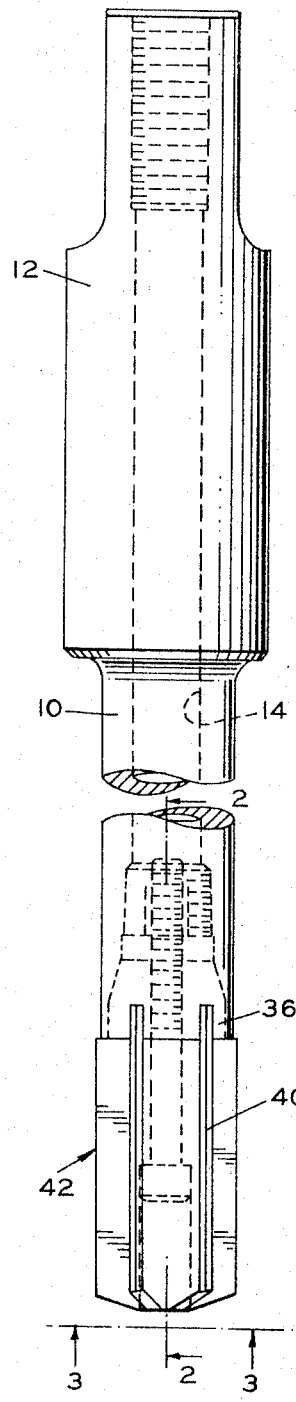
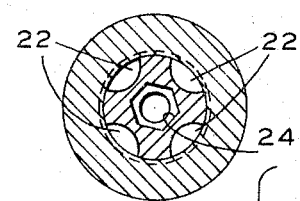
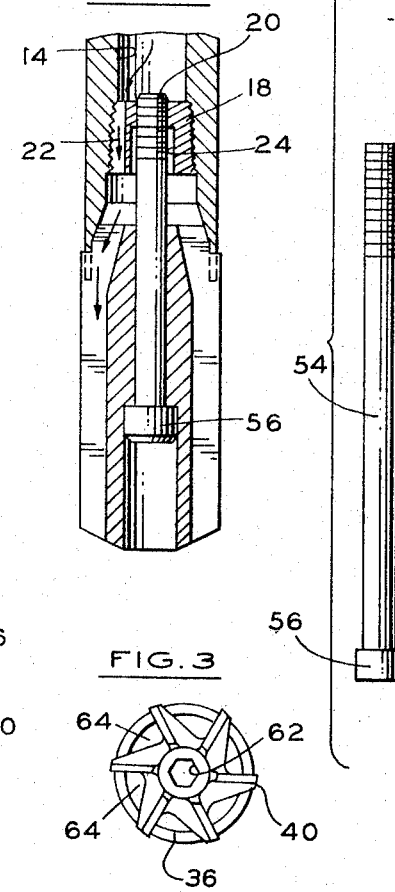
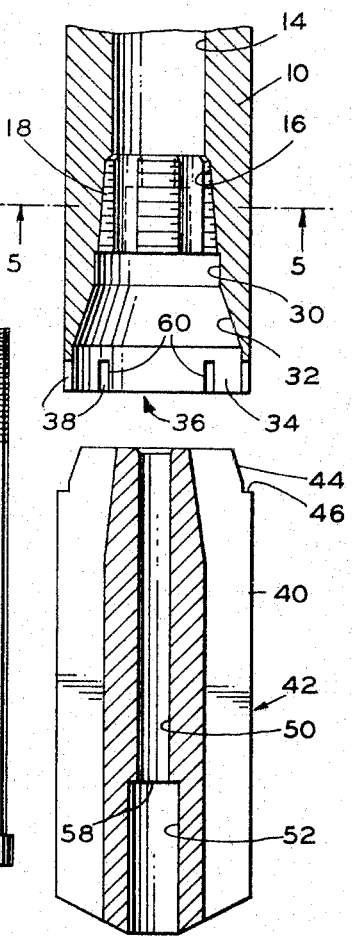
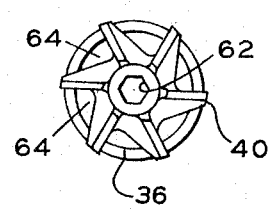
INVENTOR.
DONALD C. ANDREASSON
BY Barnes, Kisselle, Raisch & Choate
ATTORNEYS

United States Patent Office 3,320,833
Patented May 23, 1967

3,320,833
DEEP-HOLE DRILL AND REAMER
Donald C. Andreasson, Birmingham, Mich., assignor to Detroit Reamer & Tool Company, Birmingham, Mich., a corporation of Michigan
Filed Nov. 23, 1964, Ser. No. 412,953
4 Claims. (Cl. 77—68)

This invention relates to a rotary tool most generally used as a deep-hole drill and reamer. This invention is an improvement on that disclosed in a co-pending application Ser. No. 206,972, filed July 2, 1962, now Patent No. 3,169,417, dated Feb. 16, 1965.

In that patent, a reamer construction is shown utilizing a hollow tube as a drive shank with a relatively large central bore, the tube being provided at one end with a tapered outlet for receiving the tapered end of a wear tip which is brazed into place at the end of the tube. The tip has outwardly extending lands which are notched into the walls of the tube to create the double function of a mechanical drive and an overhanging skirt which directs fluid down the flutes of the tip to the cutting edges.

It is an object of the present invention to provide an improved structure which has the advantages of the previous structure with additional advantages. It has long been desired to produce a wear tip on a slender drill or reamer which could be readily removed and replaced, thus permitting salvage of the shank in the event of destruction or wear of the tip. Brazed tips from which the old tips could be removed by heating and new tips applied have been in use and such is the type disclosed in the above-mentioned patent. This has disadvantages since the parts must be cleaned before reassembly and unless care is used in the brazing operation, the coolant passages become clogged and ineffective. Also, brazing requires heating of the carbide tip which sometimes causes checking and cracking which renders the assembly useless.

It is an object of the present invention to provide a mechanism wherein a tip can be mechanically associated with a driving shank so that it can be readily removed and replaced in the event of undue wear or breakage. This can be accomplished by reason of the particular tip construction wherein a mechanical drive is built into the tip and tube inherently because of the coolant flow arrangement which is necessary to obtain desired axial flow to the tip.

It is, therefore, an object to provide an economical and inexpensive mechanical association of a tip with a driving shank in such a way that mechanical drive is transmitted from the shank to the tip and accurate alignment is insured by reason of the tip construction which co-operates also with the drive and with the coolant control.

Other objects and features of the invention relating to details of construction and operation will be apparent in the following description and claims.

Drawings accompany the disclosure and the various views thereof may be briefly described as:

FIGURE 1, a side elevation of a rotary tool in assembly the parts being shown in dotted lines.

FIGURE 2, a longitudinal section on line 2—2 of FIGURE 1 illustrating the details of the respective parts.

FIGURE 3, an end view on line 3—3 of FIGURE 1.

FIGURE 4, an exploded view of the parts in enlarged dimension.

FIGURE 5, a sectional view on line 5—5 of FIGURE 4.

Referring to the drawings:

In FIGURE 1, a tubular shank 10 having a driving end 12 is provided with a central passage 14 for coolant fluid. The end of this shank 10 is shown in sectional view in FIGURE 4 to have a tapered recess 16 in which is received a threaded and tapered plug 18. The plug 18 has a central threaded recess 20 and on its outer surface it is provided with spaced axial grooves 22 of sufficient depth that they connect with the inner passage 14 as shown in FIGURE 2 to permit the passage of coolant therethrough. A recess 24 below the threaded recess 20 is provided with a hexagonal cross-section to permit the insertion of a wrench.

Below the recess 16 is a slightly enlarged cylindrical recess 30 which enlarges outwardly in a tapered portion 32 to a cylindrical portion 34, the walls forming a skirt portion 36 having axial slots 38 to receive the spaced lands 40 of an insert 42.

As shown in FIGURE 4, the lands 40 are tapered at 44 at the upper end where the lands are reduced in cross-section somewhat to form a shoulder 46. This shoulder on assembly engages with the radial shoulder at the upper ends of the slots 38 as they are shown in FIGURE 4 to align the insert 42 with the shank 10. The insert is provided with a central axial hole 50 enlarged at the outer end 52 so that a bolt 54 having a head 56 can be inserted through the passage 50 into the threaded recess 20. The bolt head then seats against an annular shoulder 58 so that the insert can be tightened against the shank with the shoulders 46 in tight engagement with the shoulders 60 at the ends of the slots 38.

The bolt head has a hexagonal opening 62 for the insertion of a wrench. Thus, the bolt 54 can be tightened securely into the tapered plug 18. The interengagement of the lands 40 and the slots 38 creates a mechanical drive between the shank and the insert so that the bolt connection need not function in any way to create the torque.

In addition, when the parts are assembled, it will be noted that the coolant coming through passage 14 divides into the axial grooves 22 in the plug 18 and then enters the chambers 30 and 32 so that it may distribute into the flutes 64 of the insert. The skirt portions 36 which extend down into the flutes 64 between the lands 40 will guide the coolant so that it will move straight down the flutes to the extreme end of the insert, thus insuring adequate lubrication of the sides of the flutes as they engage the wall of the hole and ample lubrication and cooling of the cutting ends of the drill or reamer.

It will thus be seen that the interengagement of the lands and the axial slots serves to stabilize the parts axially to insure alignment and also functions to create a mechanical drive as well as coolant control.

I claim:
1. In a rotary tool of the type utilizing a hollow shank tube and a bit at the working end thereof composed of a different material than the shank,
   (a) a hollow shank tube having an opening at the bit end to receive one end of a bit, the walls of said tube at said bit end having spaced axial recesses,
   (b) means forming a threaded recess within said opening comprising a plug having a threaded axial opening therein, means interengaging said plug and said tube, said plug having axial openings therein to permit the passage of coolant from the interior of said tube to the bit end,
   (c) a bit having an end to be received in said opening and spaced lands to engage said axial recesses, said bit having an axial opening, and
   (d) means in said axial opening of said bit threadably engaged with said means forming a threaded recess, and having a portion to exert an axial thrust on said bit toward said tube to lock the bit and the tube together,
   (e) said engagement of said lands and said axial re- cesses forming the sole torque drive connection between said parts, and said tube having skirt portions axially overlying flutes formed between said lands to direct coolant from said tube axially into said flutes.

2. In a rotary tool of the type utilizing a hollow shank tube and a bit at the working end thereof composed of a different material than the shank, (a) a hollow shank tube having a coolant passage and an opening at the bit end to receive and center one end of a bit, the walls of said tube at said bit end having spaced axial recesses, (b) anchoring means within the hollow tube forming a locking recess within said opening while permitting coolant flow through said passage, (c) a bit having an end to be received in said opening and spaced lands to engage said axial recesses and align said bit relative to said shank, said bit having an axial opening, and (d) means in said axial opening of said bit releasably engageable with said recess in said anchoring means forming a locking recess, and having a portion to exert an axial thrust on said bit toward said tube to lock the bit and the tube together, (e) said engagement of said lands and said axial recesses forming the sole torque drive connection between said parts, and said tube having skirt portions axially overlying flutes formed between said lands to direct coolant from said tube axially into said flutes.

3. In a rotary tool of the type utilizing a hollow shank tube and a bit at the working end thereof composed of a different material than the shank, (a) a hollow shank tube having an enlarged opening at the bit end to receive one end of the bit, the walls of said tube at said bit end having spaced axial recesses, (b) a tapered plug threaded into said enlarged opening having a central threaded recess and spaced grooves on the outer surface to connect the interior of the tube to the bit end, (c) a bit having an end to be received in said opening and spaced lands to engage said axial recesses, said bit having an axial opening, and (d) bolt means in said axial opening of said bit threadably engaging the recess in said plug and having a head engaging a radial shoulder in said axial opening of said bit, whereby to exert an axial thrust on said bit toward said tube to lock the bit and tube together, (e) said engagement of said lands and said axial recesses forming the sole torque drive connection between said parts, and said tube having skirt portions axially overlying flutes formed between said lands to direct coolant from said tube axially into said flutes.

4. A rotary tool as defined in claim 3 in which the axial recesses of said tube have a radial shoulder therein, and shoulders are formed on the shank end of said bits to engage said radial shoulders on said tube to align said bit and said shank.

References Cited by the Examiner

UNITED STATES PATENTS

| | | | |
|---|---|---|---|
| 2,739,496 | 3/1956 | Fleischer | 77—68 |
| 2,867,140 | 1/1959 | Getts | 77—68 |
| 3,169,417 | 2/1965 | Andreasson | 77—68 |

FRANCIS S. HUSAR, *Primary Examiner.*